Dec. 29, 1964  J. W. OEHRLI ETAL  3,163,052
DRIVE MECHANISM FOR CHAIN SAW
Filed April 23, 1962  4 Sheets-Sheet 1
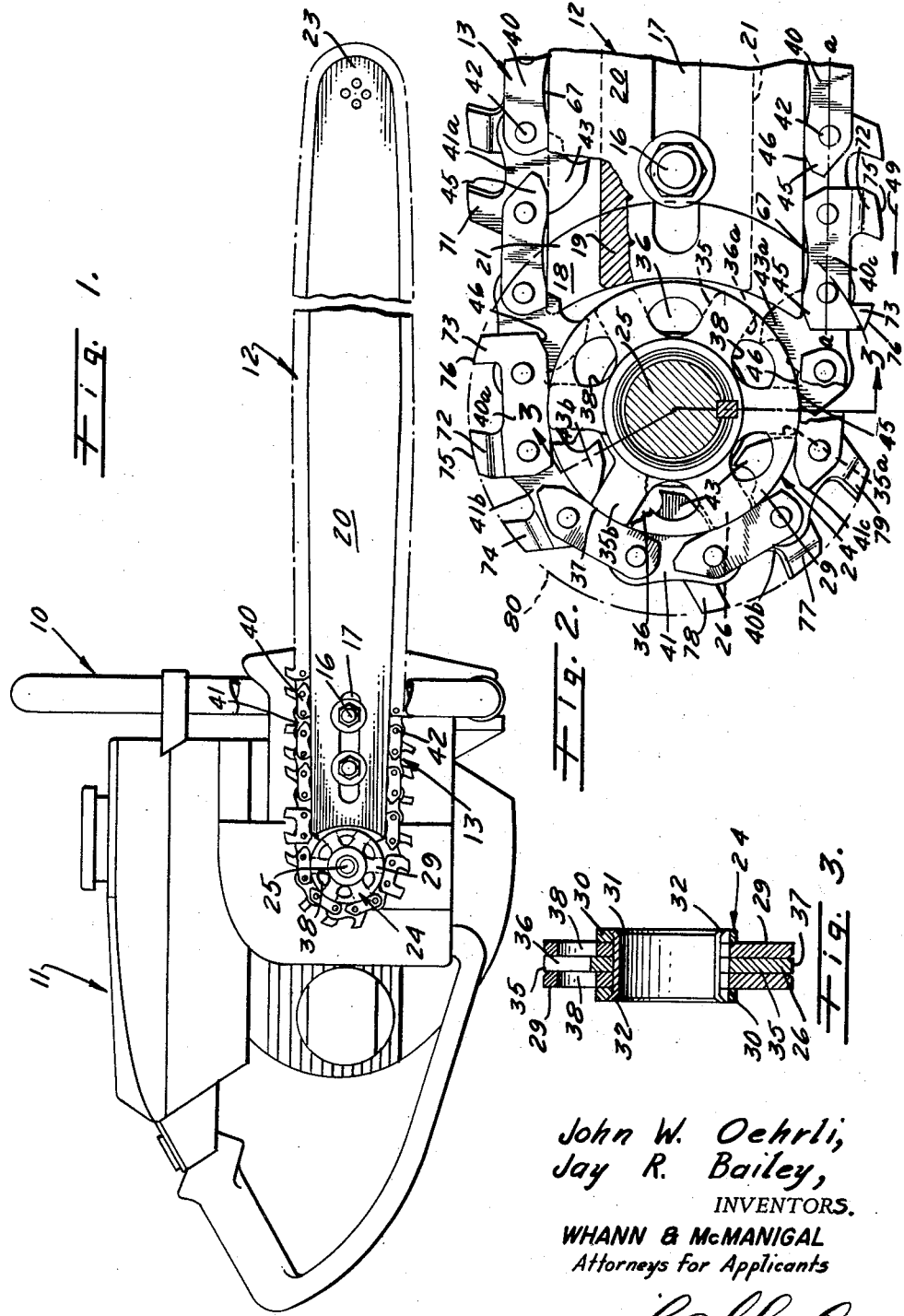
John W. Oehrli,
Jay R. Bailey,
INVENTORS.
WHANN & McMANIGAL
Attorneys for Applicants Dec. 29, 1964    J. W. OEHRLI ETAL    3,163,052
DRIVE MECHANISM FOR CHAIN SAW
Filed April 23, 1962    4 Sheets-Sheet 2
Fig. 4.
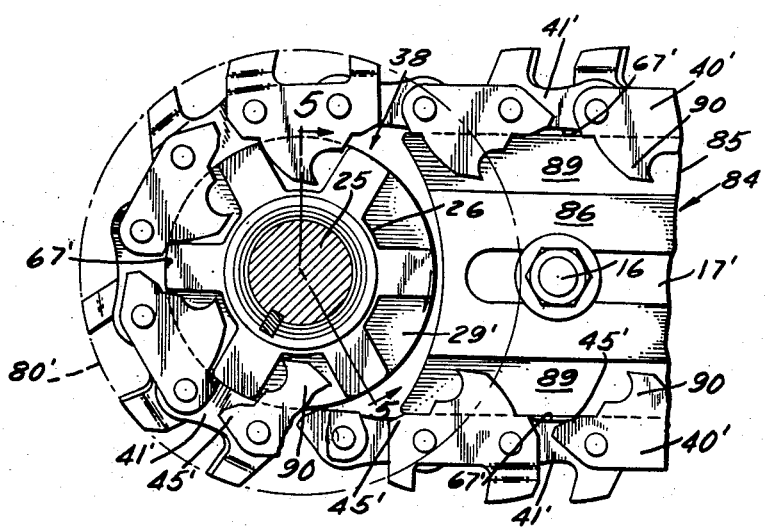
Fig. 5.
Fig. 6.
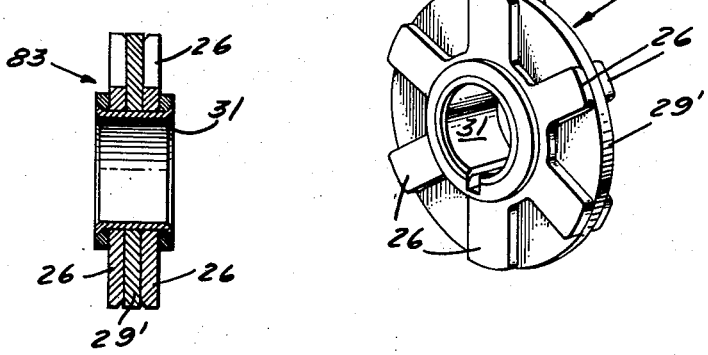
John W. Oehrli
Jay R. Bailey
INVENTORS.
WHANN & McMANIGAL
Attorneys for Applicants
by Dec. 29, 1964   J. W. OEHRLI ETAL   3,163,052
DRIVE MECHANISM FOR CHAIN SAW
Filed April 23, 1962                4 Sheets-Sheet 3
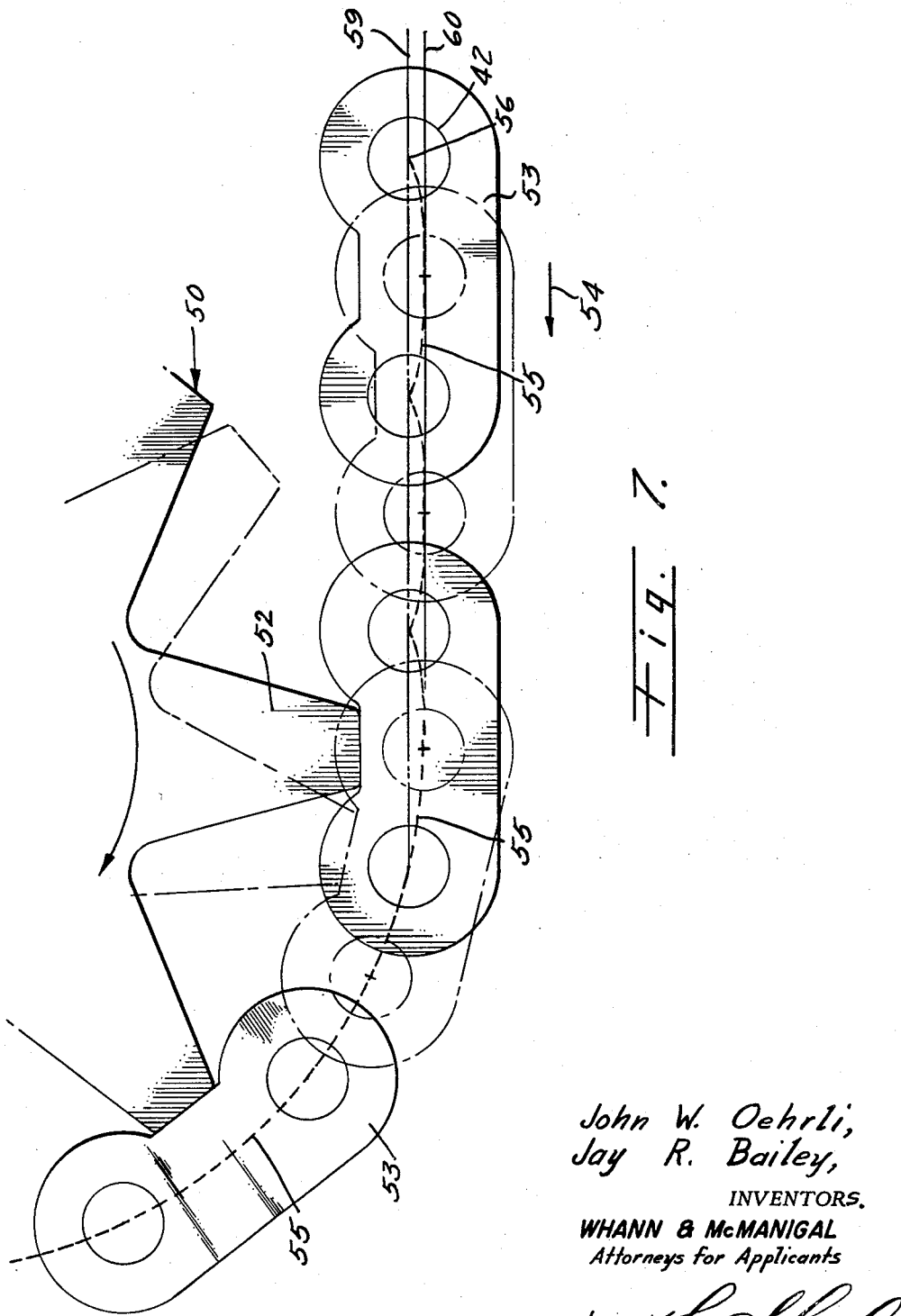
John W. Oehrli,
Jay R. Bailey,
INVENTORS.
WHANN & McMANIGAL
Attorneys for Applicants
by Dec. 29, 1964  J. W. OEHRLI ETAL  3,163,052
DRIVE MECHANISM FOR CHAIN SAW
Filed April 23, 1962  4 Sheets-Sheet 4
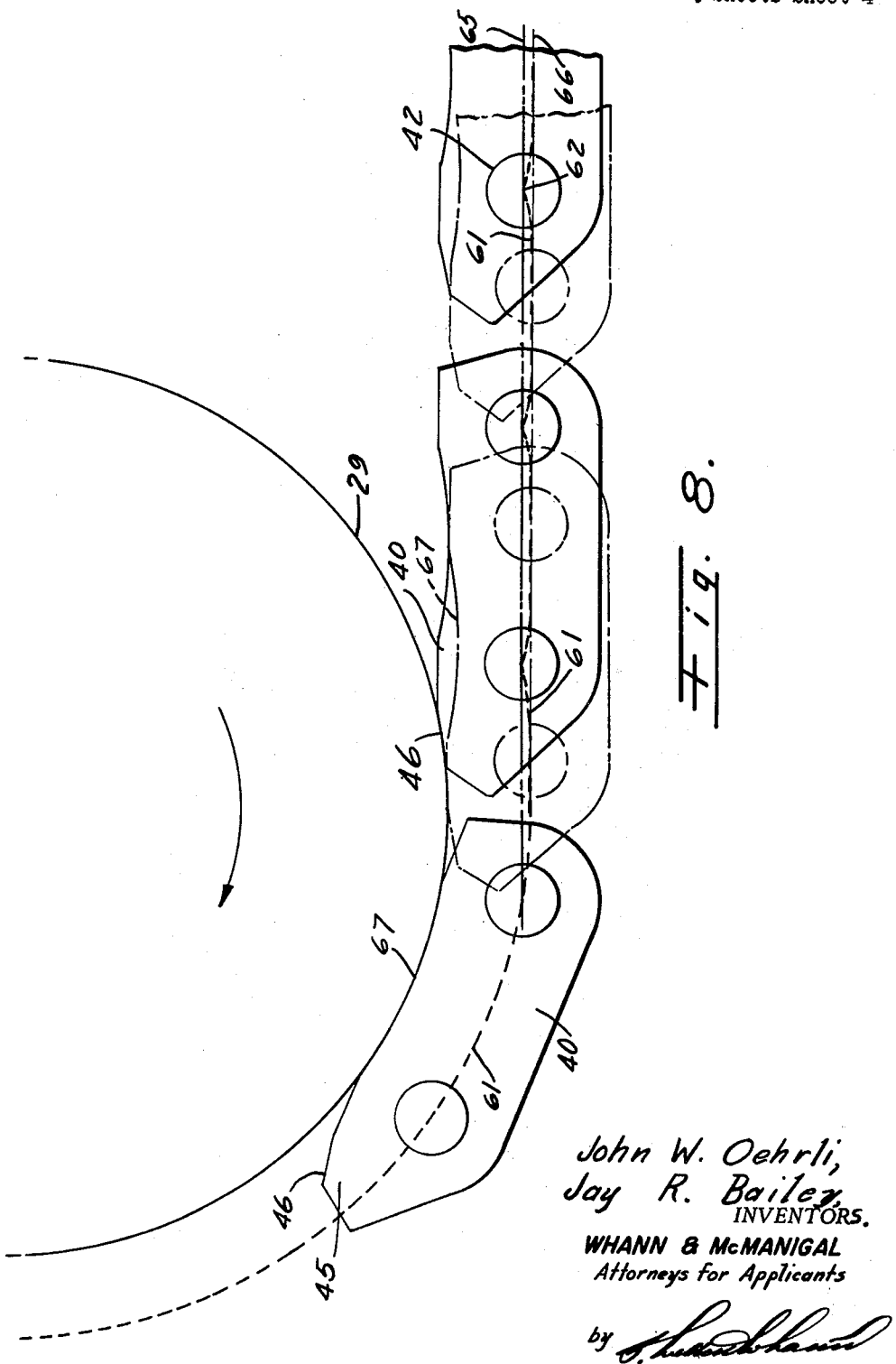
John W. Oehrli,
Jay R. Bailey,
INVENTORS.
WHANN & McMANIGAL
Attorneys for Applicants

United States Patent Office 3,163,052
Patented Dec. 29, 1964

3,163,052
DRIVE MECHANISM FOR CHAIN SAW
John W. Oehrli, Pacific Palisades, and Jay R. Bailey, Palos Verdes Estates, Calif., assignors to McCulloch Corporation, Los Angeles, Calif., a corporation of Wisconsin
Filed Apr. 23, 1962, Ser. No. 189,392
14 Claims. (Cl. 74—229)

This invention relates to a sprocket drive mechanism for chains and, more particularly, to a sprocket drive mechanism for chain saws on which the chain rides with constant radial stability and on which the chain moves into engagement with the drive sprocket with a minimum of in-and-out movement relative to the saw bar, and to the center of the sprocket.

It is an object of the invention to provide an improved chain drive mechanism.

It is another object of the invention to provide a chain drive mechanism on which the chain rides in a smoother operating performance than was heretofore possible.

It is still another object of the invention to provide a saw chain drive mechanism which eliminates teetering of the chain on the sprocket. This is an important improvement in that teetering of the chain as it occurs on conventional chain sprockets causes extreme wear on the bearing areas of the chain and sprocket.

It is a further object of the invention to provide a driving mechanism for a saw chain in which a sprocket assembly and chain cooperate as the chain members become engaged with the sprocket to greatly reduce the in-and-out or rise-and-fall movement of the chain on the sprocket and saw bar in comparison with the movement in the prior art structures. In the operation of the present invention, the line of movement of the chain as it becomes engaged with the sprocket and leaves the saw bar is substantially tangent to the pitch circle of the sprocket assembly and the chain performs in substantially the same manner as a steel belt. This is made possible by longitudinal extensions forwardly of the hinges on the links and these extensions contact the outer surfaces of the sprocket wheels and sprocket disc or discs as they approach a diameter thereof which is perpendicular to the line of action of the chain.

It is a still further object of the invention to provide a saw chain driving mechanism as described in the preceding paragraph and which, as a result of reducing the rise and fall of the chain as it engages the sprocket, also reduces the vibratory loads in the chain and the impact loads between the chain and the sprocket.

It is another object of the invention to provide a driving mechanism in cooperation with a saw chain to maintain radial stability of the chain so that cutting teeth extending outwardly from the chain may be sharpened during a cutting operation as the chain passes over the sprocket. Radial stability of the chain on the sprocket assembly is provided by limiting the said in-and-out movement of the chain and by the provision of a disc or discs secured to and axially aligned to the sprocket wheel or wheels and on which complementary surfaces of the links, other than those having the inwardly directed projections or tangs, ride when the sprocket and wheel are engaged.

It is still another object of the invention to provide a driving mechanism for a saw chain in which the chain is not engaged to be driven by a sprocket tooth until just before it becomes disengaged from the sprocket assembly so that at the entering point, no interference is encountered as the chain is meshing into the sprocket.

It is a further object of the present invention to provide a sprocket assembly which has means adjacent the pockets between the sprocket teeth to limit the lateral movement of the chain.

It is a still further object of the present invention to provide a drive mechanism for a saw chain comprised of a sprocket wheel between two discs and in which the discs have openings laterally outwardly of the pockets between the sprocket teeth to discharge the wood chips that tend to pack between the sprocket teeth.

It is another object of the invention to provide a drive sprocket mechanism in combination with a saw chain whereby varying pressures between the chain and sprocket assembly are substantially eliminated. In a conventional chain sprocket, as the chain contacts the tip of the sprocket teeth, the chain becomes tight and half a cycle later, as the links fall between the sprocket teeth, the chain is loosened. This alternate looseness and tightness results in changes in the velocity of the chain which produce shock loads causing the tension on the chain to change which, in turn, results in the chain being subjected to repetitive shock loads. These shock loads cause excessive wear and rough operation and are prevented in the present invention by the reduction of the rise and fall of the links as they move into engagement with the sprocket assembly.

It is still another object of the present invention to provide a chain saw having a chain and sprocket assembly in which the travel of the chain over the sprocket remains stable even though the chain stretches in use. This permits the sharpening of the cutters and the grinding of the depth gauges on the chain during the normal cutting operation for the lifetime of the chain.

Further objects and advantages of the invention may be brought out in the following part of the specification, wherein small details have been described for the competence of disclosure, without intending to limit the scope of the invention which is set forth in the appended claims.

Referring to the accompanying drawings, which are for illustrative purposes only:

FIG. 1 is a side elevational view of a chain saw embodying the present invention;

FIG. 2 is an enlarged fragmentary view of a saw chain driving mechanism shown in FIG. 1;

FIG. 3 is a cross sectional view of a driving mechanism taken as indicated by the lines 3—3 in FIG. 2;

FIG. 4 is an enlarged fragmentary view of another form of the invention;

FIG. 5 is a cross sectional view taken as indicated by the line 5—5 in FIG. 4;

FIG. 6 is a perspective view of the form of the invention shown in FIG. 4;

FIG. 7 is a schematic view of the travel of a link of a conventional chain as it becomes engaged with a conventional sprocket; and FIG. 8 is a schematic view of the travel of a link of a chain as it becomes engaged with the driving mechanism, according to the present invention.

Referring again to the drawings, there is illustrated in FIG. 1 a chain saw, generally designated as 10, having an engine and frame portion 11, a bar or blade 12, and a saw chain 13 which is driven by the engine and travels on the bar.

The bar 12 is adjustably secured to the engine 11 by bolts 16 extending through a slot 17 in the bar. The bar 12 is of the grooved type, as indicated in FIG. 2, formed of three laminated plates 18, 19 and 20. The outer plates 18 and 20 are coextensive and the center plate 19 is overlapped at its opposite transverse edges by the outer plates so as to form the groove 21 therebetween. The groove also extends over the nose 23 where the center plate is longitudinally shorter than the outer plates.

The chain is driven by a sprocket assembly, generally designated as 24, keyed to engine drive shaft 25, as shown in FIG. 2, or to clutch drum, not shown. As best seen in FIGS. 2 and 3, the sprocket assembly 24 is comprised of a sprocket 26 sandwiched between two discs 29 of the same diameter as the sprocket and axially aligned and integral therewith. Outwardly of each of the discs is a washer 30. The five members 26, 29, 29, 30, 30 are secured together by placing them as shown in FIG. 3 and sliding a tube 31 through their aligned central openings and then swaging the tube at 32. The assembly is further secured by brazing and the proper inside diameter is then bored into the tube 31.

There are six teeth 35 of relatively large size on the sprocket 26 and spaced circumferentially between them are pockets 36. The outer circumferential surfaces 37 of the teeth 35 are on the same arc as the circumferential surfaces of the discs 29. Laterally outwardly of the pockets 36, extending through the discs 29, are elliptical openings 38 provided for permitting the chips which enter the sprocket to be expelled therefrom. It has been found that the elliptical shape provides an unusual result for this purpose, whereas with a circular-shaped opening, the chips had to be drilled from between the sprocket teeth.

As shown in FIGS. 1 and 2, the saw chain includes side links 40 and center links 41 connected consecutively by pintles 42. Extending inwardly on the chain on the center links 41 are sprocket-engaging projections or tangs 43 so as to extend in the bar groove 21 while the side links ride on the outer peripheral edges of the outer plates of the bar 12.

As best seen in FIGS. 2 and 8, on the leading ends of the side links 40 and the center links 41 are extensions 45 disposed longitudinally forwardly of the pintles and of the tangs 43. Each extension 45 is limited longitudinally to provide clearance with the trailing end of the preceding forward link and is relieved vertically outwardly so as to form a sloping or angle surface 46.

As the chain moves along the lower portion of the bar in the direction of the arrow 49, each sloping surface 46 on the center links makes its first contact with the outer circumferential surface 37 of the lower tooth 35a and, similarly, as shown in FIG. 8, each sloping surface 46 on the side links makes the first contact for each side link on the outer circumferential surface on the discs 29. Simultaneously, as the sloping surface 46 on the center link makes contact with the outer circumferential surface 37 of the sprocket, its tang 43a is entering pocket 36a in which it is laterally restrained by the discs. It should be noted that the contact of the surface 46 with the surface 37 occurs before the former reaches the vertical diameter through the sprocket assembly and which is substantially perpendicular to the path of the chain at the point where the line of direction of the chain would form a tangent with surface 37, and the same is true of the surface 46 on each side link relative to the circumferential surfaces of the discs. The result of the contact of the sloping surface 46 of the extensions on the links on the circumferential surfaces of the sprocket teeth and the side discs limits the vertical movement of the side and center links on the sprocket assembly and on the bar adjacent thereto so as to provide a smooth and constant positioning of the chain on the sprocket assembly.

This can be best understood from a study of FIGS. 7 and 8. In FIG. 7 is shown a conventional sprocket 50 having teeth 52 and moving into and being engaged therewith are individual side links 53 of a conventional saw chain. The links are moving in the direction of the arrow 54 along an unshown bar toward the sprocket. The resulting in and out movement of the chain relative to the bar and sprocket is indicated by the path 55 of the axes 56 of the pintles 42. The axes of the pintles move along the bar on line 59 and as they approach the sprocket as the result of previous links becoming engaged therewith, they move outwardly as far as line 60 and then return along the path 55 to the line 59. After a link becomes fully engaged with the sprocket 50, the path 55 becomes an arc of a circle substantially concentric with the sprocket.

FIGS. 7 and 8 are drawn to scale with the horizontal distance between the pintles and the diameters of the discs and sprockets being equal. In FIG. 8 the sprocket teeth are not shown because the side links make a contact with the outer surface of the discs 29 equivalent to the contact that the center links make with the outer surface of the sprocket teeth. The path 61 of the axes 62 of the pintles of the side links 40 is of the same general configuration as the path 55 of the axes of the pintles of the conventional links 53. In FIG. 8, the line of direction of the pintles along the bar is shown at 65 and the line 66 indicates the outer limit of the movement of the axes 62.

As a sloping surface 46 makes contact with the outer surface of a disc 29, the link is caused to move outwardly only the distance between the lines 65 and 66 and then moves inwardly to form that portion of the path 61 which is concentric to the disc 29 and the sprocket. By having the sloping surface flat, contact with the discs and the sprocket on a mere point of the links is avoided and this prevents damage to the links.

In comparing FIGS. 7 and 8, which are to scale, the distance between the axes of the pintles being the same and the diameters of the sprockets and discs being equal, it may be seen that the in-and-out movement between lines 65 and 66 in FIG. 8 is about half of the in-and-out movement between lines 59 and 60 in FIG. 7. The in-and-out movement results in the variation of velocity of the chain, the sprocket velocity being constant, and the less variation there is in the chain velocity, the smoother the chain action and the less the amount of the dynamic loads on the chain. Further, by having the chain enter into engagement with the sprocket assembly in the manner shown in FIGS. 2 and 8, teetering is prevented and the wear which occurs as the result of teetering in a conventional chain between the mating parts is substantially eliminated.

To further aid in positioning the chain radially on the sprocket assembly, each side link 40 has a longitudinally arced, inwardly facing surface 67. The arced surfaces 67 have the same radii as the discs 29 and the sprocket 26 and when a link 40 moves past the first engaged tooth 35a of the sprocket, the center of the arc 67 and the center of the sprocket assembly 24 become coincident, the surfaces 67 riding on the circumferential surface of the discs 29 so as to maintain the chain links concentric with the sprocket assembly in a constant radial position with non-teetering movement. Since the chain on the sprocket assembly remains in a constant radial position after the first tooth 35a is engaged, there are substantially no variations in pressure between the chain and sprocket assembly and as the pressures remain substantially constant, there is no vibration and little wear in the chain and sprocket so as to provide a very smooth running chain.

In the sprocket and chain arrangement, as shown in FIG. 2, the tangs 43 are not in driven contact with the sprocket teeth 35 until just prior to the position where the chain leaves the sprocket assembly, as where sprocket tooth 35b is in contact with tang 43b. By having the drive occur as the chain leaves the sprocket, no interference is encountered as the chain enters into engagement with the sprocket, as may be seen in FIG. 2, where the first two engaged tangs are spaced from the respective teeth 35 of the sprocket. Thus, the engaging action is particularly smooth. This type of drive develops in a gradual approach; that is, the sprocket tooth 35a rotates it gradually changes its relative non-contacting position with the tang ahead of it until it finally takes the position of the tooth 35b in contact with the tang 43b. Another advantage of this arrangement is that it eliminates wear which occurs in conventional chains, where there is a rapid rather than gradual approach, whereby there is a pounding of the center links as they first engage the sprocket tip.

As shown in FIG. 2, there is a sequence of cutters, starting at the top, with flat-sided center cutter 71 on a selected center link 41a. Longitudinally spaced from the center cutter 71 is a right-hand offset side cutter 72 on a selected side link 40a and extending outwardly from the leading edge of the link 40a is a depth gauge 73 of predetermined height corresponding to the height of the cutter 72.

On a selected center link 41b, immediately following cutter 72, is a right-hand offset center cutter 74. Longitudinally spaced from the center cutter 74 is a left-hand offset side cutter 77 on a selected side link 40b, having at its forward end a depth gauge 78 of corresponding height to the cutter 77. The cutter and depth gauge 77 and 78 are in allochiral relationship with the cutter and depth gauge 72 and 73, respectively. Immediately following the cutter 77, on a selected center link 41c, is a left-hand offset center cutter 79 in allochiral relationship with the right-hand offset center cutter 74.

Following the center cutter 79 is a second right-hand offset side cutter 72 and a corresponding depth gauge 73 on a selected right side link 40c. In the cutter arrangement, the flat center cutter 71 overlaps the right-hand offset center cutter 74 which in turn overlaps the right-hand side cutter 72. Similarly, the left-hand offset center cutter 79 overlaps the flat center cutter 71 on its inner side and overlaps the left-hand offset side cutter 77 on its outer or left-hand side.

The outer circumferential surfaces 75 of the cutters and the outer circumferential surfaces 76 of the depth gauges lie on equivalent arcs of equal radii, the centers of which are located on an unshown line, perpendicular to the horizontal center plane a—a of the chain, shown in the lower portion of FIG. 2, and extending midway between the axes of each pair of pintles 42 so that the vertical distance of the outer surfaces of the depth gauges and the cutters, including the cutting edges, from the plane a—a, is determined by the longitudinal distance from the aforesaid unshown line, as well as from the axes of the pintles. Thus, the forward or leading outer edges of the two cutters 72 are of the same distance from the plane a—a and, therefore, are the same horizontal distance from the axes of the respective pintles of the side links 40a and 40c.

As the path 61, as shown in FIG. 8, of the axes of the pintles 42 becomes concentric with the sprocket assembly, the arcs of the outer surfaces of the cutters and depth gauges, having the same radii, also become concentric with the sprocket assembly so as to travel in the path of a single arc 80, as shown in FIG. 2, the center of the arc 80 being coincident with the center of the sprocket assembly.

By this particular arrangement, the cutters and depth gauges, having their outer surfaces on arcs of equal radii, and being spaced longitudinally relative to the axes of the pintles to determine their height above the center plane a—a, when rotated onto the sprocket assembly, are there maintained in a constant radial position concentric therewith. This makes it possible to sharpen the chain with a whetting member fixed on the chain saw engine frame whereby each outer surface of each cutter and each depth gauge contacts the sharpening surface at the same distance from the center of the sprocket assembly, that is, on the arc 80. This is true even through the chain has stretched, as stretching does not change the position of the chain on the sprocket assembly. This provides a much better way of sharpening than does the use of an individual file, both as to speed and as to accuracy. In addition, it permits the cutting teeth and depth gauges to be made harder than they can be made when the sharpening is accomplished by a file.

In FIGS. 4, 5 and 6, another form of the invention is shown. Here, there is a sprocket assembly 83 having two sprockets 26 sandwiching a disc 29', having the same diameter as the sprockets and axially aligned therewith. The sprocket assembly 83 is formed in the same manner as the sprocket 24 on a tube 31 and it is also keyed to the driving shaft 25 of the chain saw engine, or to clutch drum, in the same manner as the latter.

For use with the sprocket assembly 83, a saw bar 84 is provided. This bar is formed of a center plate 85 laminated between the two side or outer plates 86. The center plate 85 transversely overlaps the side plates 86 to form a longitudinal tongue or track 89 extending longitudinally along both transverse edges of the bar and over the outer end or nose, not shown. The saw bar is secured to the chain saw engine by bolts 16 extending through slot 17'.

The cutter and depth gauge arrangement in the chain shown in FIG. 4 is the same as that shown in FIG. 2, but in the former the tangs are on the side links instead of on the center links. Thus, the tangs or projections 90 extend inwardly from the side links 40' so as to straddle the bar tongue 89, the center links 41' riding on the outer peripheral edge of the tongue.

In this embodiment the tangs 90 engage each of the sprockets in the same manner as the tangs 43 engage the center sprocket in FIG. 2, the drive of the sprocket against the tang occurring just before the tang leaves the sprocket. Also, the disc between the sprockets limits the lateral movement of the tangs in the same manner as do the discs on the exterior of the sprocket. In this embodiment, the links 40' and 41' have extensions 45' identical with those on the links 40 and 41. The extensions 45' limit the vertical movement of the chain on the sprocket in the same manner as described above, in this case the extensions on the side links making contact with the outer circumferential surfaces of the first sprocket teeth engaged and the extensions on the center links making contact with the outer circumferential surface of the disc 29' just before the vertical center line through the drive sprocket which is substantially perpendicular to the path of the chain on the bar. Correspondingly, longitudinally directed, inwardly facing arced surfaces 67' on the center links ride on the outer circumferential surface on the disc 29' after each center link becomes fully engaged with the drive mechanism, to accomplish a constant radial positioning of the chain on the sprocket assembly for sharpening purposes and for reduction of chain wear.

As described above, the outer circumferential surfaces of the cutters and depth gauges, being on equivalent arcs, rotate on the sprocket assembly on the arc 80' having the same radius as the arcs of the outer surfaces of the teeth and depth gauges and having its center coincident with the center of the driving mechanism. Thus, with the embodiment shown in FIG. 4, the same smooth operation is obtained as indicated relative to the embodiment shown in FIG. 2 and the same reduction of the in-and-out movement of the links is obtained as is shown in FIG. 8.

In the sprocket assembly 83 there is no requirement for openings through the disc 29' in that the chips do not tend to congregate in the sprockets between the teeth.

It is clear that the sprocket and disc arrangements used in cooperation with the correspondingly arranged center and side links of the saw chain, without departing from the inventive principles disclosed herein, may be used in other forms for the positioning of the chain on the sprocket assembly as it becomes engaged therewith to eliminate teetering and the accompanying wear, and to provide a constant radial positioning of the chain with respect to the sprocket assembly in which the chain is first engaged to be driven by the sprocket just before the former is disengaged from the latter.

We claim:

1. A sprocket wheel assembly for driving a chain comprising:

(a) a pair of axially aligned sprocket wheels, said wheels having radially directed teeth;
(b) and a disc spaced immediately between and aligned with, substantially coextensively with, said sprocket wheels, said teeth having outer circumferential surfaces of the same diameter as said disc.

2. A sprocket wheel assembly for driving a chain comprising:
(a) a pair of axially aligned discs;
(b) and a sprocket wheel axially aligned with and between said discs, said wheel having radially directed teeth, said teeth having outer circumferential surfaces of the same diameter as said discs.

3. A sprocket wheel assembly for driving a chain comprising:
(a) a pair of axially aligned sprocket wheels, said wheels having radially directed teeth;
(b) a disc spaced immediately between and aligned with, substantially coextensively with, said sprocket wheels;
(c) and outer circumferential surfaces of the sprocket wheel teeth being on arcs whose centers are coincident with that of the disc, and arcs and said disc having equal radii;
(d) the entire inner lateral surfaces of said wheels and teeth being in abutment with respective sides of said disc.

4. A sprocket wheel assembly for driving a chain comprising:
(a) a pair of axially aligned discs;
(b) a sprocket wheel axially aligned with and between said discs, said wheel having radially directed teeth;
(c) and outer circumferential surfaces of the sprocket wheel teeth being on arcs whose centers are coincident with that of the discs, said arcs and said discs having equal radii.

5. A sprocket wheel assembly for driving a chain comprising:
(a) a pair of axially aligned discs;
(b) a sprocket wheel between said discs and in abutment therewith;
(c) outer circumferental surfaces of the sprocket wheel teeth being on arcs whose centers are coincident with that of the discs, said arcs and said discs having equal radii;
(d) and openings through said discs laterally outwardly of the spaces between said teeth to permit the passage of cuttings therethrough.

6. A sprocket wheel assembly for driving a chain comprising:
(a) a pair of axially aligned discs;
(b) a sprocket wheel between and axially aligned with said discs and in abutment therewith;
(c) outer circumferential surfaces of the sprocket wheel teeth being on arcs whose centers are coincident with that of the discs, said arcs and said discs having equal radii;
(d) and openings through said discs laterally outwardly of the spaces between said teeth to permit the passage of cuttings therethrough,
(e) said openings being elliptical and being radially inwardly of the circumferential edges of said discs adjacent the bases of the spaces between the teeth.

7. A sprocket wheel assembly for driving a chain comprising:
(a) a pair of axially aligned discs;
(b) a sprocket wheel between and axially aligned with said discs and in abutment therewith;
(c) outer circumferential surfaces of the sprocket wheel teeth being on arcs whose centers are coincident with that of the discs, said arcs and said discs having equal radii;
(d) and openings through said discs laterally outwardly of the spaces between said teeth to permit the passage of cuttings therethrough,
(e) said openings being elliptical and being radially inwardly of the circumferential edges of said discs adjacent the bases of the spaces between the teeth,
(f) said openings having their minor axes extending radially.

8. In a chain saw of the type having an endless saw chain driven by sprocket wheel means, said chain having side links and center links alternately connected by hinge means, projections extending inwardly from first consecutive links engaging sprocket teeth on said wheel means, the improvement comprisng:
(a) disc means on said sprocket wheel means extending radially circumferentially adjacent and laterally outwardly of the space between said teeth,
(b) said disc means and said sprocket wheel means being axially aligned;
(c) means on said first links for engaging the outer circumferential surfaces of the sprocket teeth for limiting the in-and-out movement of the chain as it approaches and engages said sprocket wheel means;
(d) second consecutive links having an inwardly facing longitudinally arced transverse surface for riding on said disc means;
(e) and means on said second links for engaging the outer circumferential surfaces of the disc means for limiting the in-and-out movement of the chain as it approaches and engages said sprocket wheel means.

9. In a chain saw of the type having an endless saw chain driven by sprocket wheel means, said chain having side links and center links alternately connected by hinge means, projections extending inwardly from first consecutive links engaging sprocket teeth on said wheel means, the improvement comprising:
(a) disc means on said sprocket wheel means extending circumferentially adjacent the pockets between said teeth, said disc means and said sprocket wheel means being axially aligned;
(b) outer circumferential surfaces on said teeth of the sprocket wheel means being on arcs whose centers are coincident with the center of the disc means, said arcs and said disc means having equal radii;
(c) vertically outwardly relieved extension means extending longitudinally forwardly of the forward hinge means on said first links for engaging the outer circumferential surfaces of the sprocket teeth for limiting the in-and-out movement of the chain as it approaches and engages the sprocket wheel means;
(d) second consecutive links having an inwardly facing longitudinally arced transverse surface for riding on said disc means;
(e) and vertically outwardly relieved extension means extending longitudinally forwardly of the forward hinge means on said second links for engaging the outer circumferential surfaces of the disc means for limiting the in-and-out movement of the chain as it approaches and engages the sprocket wheel means.

10. In a chain saw of the type having an endless saw chain driven by sprocket wheel means, said chain having side links and center links alternately connected by hinge means, projections extending inwardly from first consecutive links engaging sprocket teeth on said sprocket wheel means, the improvement comprising:
(a) disc means on said sprocket wheel means extending radially circumferentially adjacent and in lateral alignment with the pockets between said teeth, said disc means and said sprocket wheel means being axially aligned;
(b) vertically outwardly relieved extension means extending longitudinally forwardly of the forward hinge means on said first links for engaging the outer circumferential surfaces of the sprocket teeth for limiting the in-and-out movement of the chain as it approaches and engages said sprocket wheel means;
(c) second consecutive links having an inwardly facing longitudinally arced transverse surface for riding on said disc means;
(d) vertically outwardly relieved extension means extending longitudinally forwardly of the forward hinge means on said second links for engaging the outer circumferential surfaces of the disc means for limiting the in-and-out movement of the chain as it approaches and engages said sprocket wheel means;
(e) and a driving engagement between said sprocket means and said chain occurring on a sprocket tooth and the last projection on the chain just before it becomes disengaged from said sprocket wheel means.

11. In a chain saw of the type having an endless saw chain driven by a sprocket wheel, said chain having side links and center links alternately connected by hinge means, projections extending inwardly from first consecutive links engaging sprocket teeth on said sprocket wheel, the improvement comprising:
(a) a pair of axially aligned discs having said sprocket wheel therebetween, and in abutment therewith;
(b) outer circumferential surfaces of the sprocket teeth being on arcs whose centers are coincident with that of the discs, said arcs and discs having equal radii;
(c) elliptical openings through said discs laterally outwardly of the spaces between said teeth to permit the passage of cuttings therethrough,
(d) said openings being radially inwardly of the circumferential edges of said discs adjacent the bases of the spaces between the teeth and having their minor axes extending radially;
(e) vertically outwardly relieved extensions extending longitudinally forwardly of said hinge means on the forward first links for engaging the outer circumferential surfaces of the sprocket teeth for limiting the in-and-out movement of the chain as it approaches and engages said sprocket wheel;
(f) second consecutive links having an inwardly facing longitudinally arced transverse surface for riding on said discs;
(g) and vertically outwardly relieved extensions extending longitudinally forwardly of the forward hinge means on said second links for engaging the outer circumferential surfaces of the discs for limiting the in-and-out movement of the chain as it approaches and engages said sprocket wheel means.

12. The invention according to claim 9 in which teeth on the sprocket wheel means make driving contact for the first time with the projections extending inwardly on the chain just before said projections become disengaged from said sprocket wheel means.

13. In a chain saw of the type having an endless saw chain driven by sprocket wheel means, said chain having side links and center links alternately connected by hinge means, projections extending inwardly from selected links engaging sprocket teeth on said wheel means, the improvement comprising:
(a) a sprocket wheel means including a pair of axially aligned discs;
(b) a sprocket wheel between, axially aligned with, and in abutment with said discs;
(c) outer circumferential surfaces of the sprocket wheel teeth being on arcs whose centers are coincident with that of the discs, said arcs and said discs having equal radii; and
(d) openings in said discs to permit cuttings to be discharged from between said teeth.

14. A sprocket wheel assembly for driving a chain comprising:
(a) a pair of axially aligned discs;
(b) a sprocket wheel between, axially aligned with, and in abutment with said discs;
(c) outer circumferential surfaces of the sprocket wheel teeth being on arcs whose centers are coincident with that of the discs, said arcs and said discs having equal radii; and
(d) means in said discs to permit cuttings to be discharged from between said teeth.

References Cited in the file of this patent

UNITED STATES PATENTS

| | | |
|---|---|---|
| 1,141,869 | Douglas | June 1, 1915 |
| 1,953,362 | Martaugh | Apr. 3, 1934 |
| 2,446,774 | Mall | Apr. 10, 1948 |
| 2,599,233 | Christie | June 3, 1952 |
| 2,725,755 | Riopelle et al. | Dec. 6, 1955 |
| 2,800,031 | Schultz | July 23, 1957 |
| 3,045,502 | Carlton | July 24, 1962 |
| 3,054,300 | Bowman | Sept. 18, 1962 |
| 3,062,067 | Deming | Nov. 6, 1962 |
| 3,087,350 | Reed | Apr. 30, 1963 |
| 3,091,129 | Bessette | May 28, 1963 |

OTHER REFERENCES

German patent appl. 1,040,335 printed Oct. 2, 1958 (Kl. 47 h 11) (2 pages spec., 1 sheet dwg.), 74-243.

UNITED STATES PATENT OFFICE
CERTIFICATE OF CORRECTION

Patent No. 3,163,052                                  December 29, 1964

John W. Oehrli et al.

It is hereby certified that error appears in the above numbered patent requiring correction and that the said Letters Patent should read as corrected below.

Column 7, lines 3 and 4, for "and a disc spaced immediately between and aligned with, substantially coextensively with, said" read -- and a disc spaced immediately between, substantially coextensively with, and aligned with said --; lines 18 and 19, for "a disc spaced immediately between and aligned with, substantially coextensively with, said sprocket" read -- a disc spaced immediately between, substantially coextensively with, and aligned with said sprocket --; column 10, line 35, for "Martaugh" read -- Murtaugh --; line 36, for "Apr. 10, 1948" read -- Aug. 10, 1948 --.

Signed and sealed this 22nd day of February 1966.

(SEAL)
Attest:

ERNEST W. SWIDER                                EDWARD J. BRENNER
Attesting Officer                                    Commissioner of Patents